Jan. 18, 1927.
R. N. PATTERSON ET AL
1,614,686
VESTIBULE CAR DOOR AND TRAP
Filed March 18, 1925
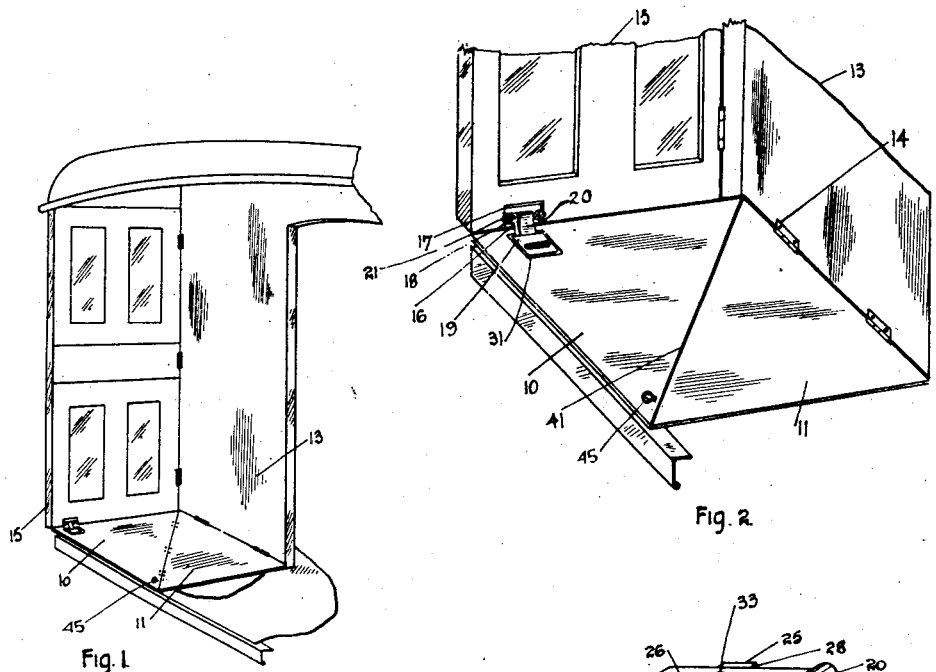
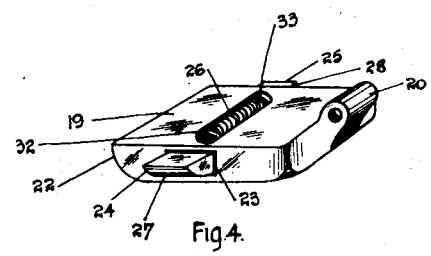
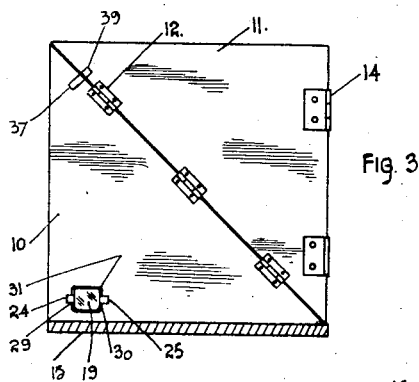
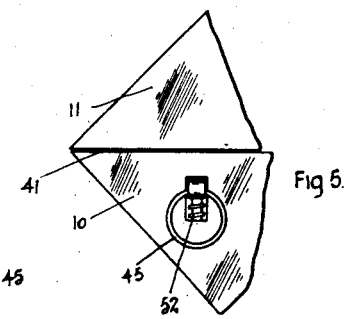
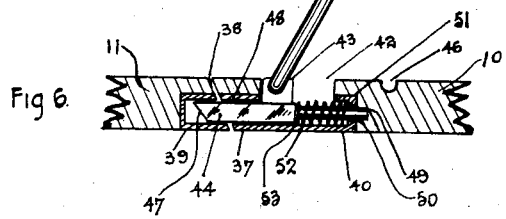
Inventor.
R. N. Patterson & A. G. Fell.
By.
E. J. Fetherstonhaugh
Attorney.

Patented Jan. 18, 1927.

1,614,686

UNITED STATES PATENT OFFICE.

RALPH NORMAN PATTERSON AND ALFRED GRAVE FELL, OF MONTREAL, QUEBEC, CANADA, ASSIGNORS OF ONE-FIFTH TO JEROME BONAPARTE BELL, OF MONTREAL, CANADA.

VESTIBULE-CAR DOOR AND TRAP.

Application filed March 18, 1925. Serial No. 16,448.

The invention relates to a car vestibule door and trap, as described in the present specification and illustrated in the accompanying drawings that form part of the same.

The invention consists essentially of the novel features of construction pointed out broadly and specifically in the claims for novelty following a description containing an explanation in detail of an acceptable form of the invention.

The objects of the invention are to safeguard the lives of passengers in railway passenger cars by avoiding the accidents due to the negligence of attendants in failing to close the trap doors covering the open spaces over the steps following the closing of the vestibule door; to insure the efficient operation of the trap and vestibule door coincidently in opening and closing movements; to release the door from the trap for the use of the latter at elevated platforms; to automatically lock the vestibule door at each operation of the door and trap together in their closing movement; to simplify the construction and produce this car specially at a moderate cost to the railway; and generally to provide a reliable and serviceable device to accomplish the aforesaid purposes.

In the drawings, Figure 1 is a perspective view of the car end at one side, showing the vestibule door and attached trap.

Figure 2 is an enlarged perspective of the parts to this invention, the end wall of the car body being broken away.

Figure 3 is an underneath plan view of the trap, showing the vestibule door in section.

Figure 4 in an enlarged detail of the detachable hinged joint from vestibule door to the trap.

Figure 5 is an enlarged detail of the trap spring lock.

Figure 6 is an enlarged sectional view of lock and casing secured to the trap part.

Like numerals of reference indicate corresponding parts in the various figures.

Referring to the drawings, the trap door in split diagonally into the halves 10 and 11 and these halves are secured together by the hinges 12, which permit the halves to fold upwardly. The trap part 11 is secured to the end wall 13 of the car by the hinges 14 and folds upwardly against said car wall 13 bringing along with it the part 10 fastened thereto by hinges as aforesaid.

The part 10 is secured to the door 15 adjacent to the outer edge of the latter and at the extreme outside corner of said trap part 10 by the hinge 16 which is formed of the plate 17 countersunk in and secured to the door 15 and has the hinge barrel sections 18 projecting therefrom and registering with the barrel sections from the hinge leaf 19 indicated by the numeral 20, said barrels 18 and 20 being connected by the pin 21.

The leaf 19 is formed with the bevelled and finished end 22 and the latch recess 23 into which the spring latches 24 and 25 are introduced and held to their outer positions by the spring 26 the ends of the latches being bevelled on their undersides 27 and 28. The catches 29 and 30 are formed in the recess 31 in the trap part 10 adjacent to the outer corner, said catches 29 and 30 may form part of a plate 31 countersunk in the part 10. The thumb lugs 32 and 33 have pin ends extending into the latch recess and secured to the latches 24 and 25, so that by pinching these thumb lugs against the pressure of the spring 26 the latches are released and the hinge detached from the trap leaving the latter free so that the passenger may walk out of the car, over said trap on to an elevated platform, as the vestibule door opens inwardly over the trap and in opening the spring leaf acts as a door stop for the end is bevelled and curved to form a runner which will in no way damage the trap surface.

The lock casing 37 is obliquely split at 38 to form two sections 39 and 40, the section 40 being secured to the underside of the part 10 at the far corner from the door 15 and under the slot 41 and the section 39 being secured to the part 11, said part 40 having a slot 42 for a ring lug 43 extending upwardly from the latch bolt 44 and having the ring 45 pivotally secured and ordinarily flush with the surface of the trap, the latter being slotted at 46 to receive said ring.

The latch bolt 44 is bevelled at its front end 47 and is slidably arranged in the casing 37 and is adapted to bridge the split between the parts 10 and 11 as well as the split 38 of the casing 37 so that the flat 48 of the latch bolt crosses the split 38 and turns said latch bolt into a locking bolt.

The latch bolt 44 is reduced at its rear portion to form a centering pin 49 sliding in the orifice 50 in the rear wall 51 of the casing 37, the spring 52 encircling said centering pin between the shoulder 53 and the rear wall 51 of said casing.

The casing 37 is rigidly secured to the parts 10 and 11 in sections 40 and 39 respectively and contains all the locking and opening mechanism for both trap and vestibule door.

In the operation of this invention the usual conditions are the low platforms at the stations and the car steps necessary to reach them and under these circumstances the trap remains permanently attached to the door 15 by the detachable hinge during the period of ordinary travelling. To open the trap under such circumstances the ring is grasped and the latch bolt slipped back against the spring pressure, thereby releasing the lock and coincidently raising the trap on the line of the diagonal split. This action pulls the door 15 to its open position and both trap and door fold to the open position against the end car wall and disclose the steps. At very large centres there are elevated platforms necessitating the opening of the door 15 over the trap and using the latter for walking off the car and to do this all that is necessary is to release the leaf of the spring from the trap and open the door. To close the door it is simply let down and latched which springs the bolt into place.

It must be emphasized herein that this invention eliminates the ordinary lock on the door, as the closing of the trap and vestibule door securely fastens the door as it cannot possibly be opened from the outside, thereby not only effecting economy, but automatically locking up the car and thus avoiding carelessness.

Another point that may be brought forward in respect to this trap is that there is an entire absence of vibration for on the one side it is secured to the car body, on the other side to the door, and the two parts are rigidly locked together.

What we claim is:—

1. In a vestibule door and trap, a diagonally split trap hinged to the car wall and to said door and detachable from the latter, said trap when the door is detached being adapted to form an exit platform.

2. In a vestibule door and trap, a diagonally split trap having its parts hinged together to fold upwardly and permanently hinged to the end car wall and a hinge having one part extending from the door and spring held to the other part secured to the trap.

3. In a vestibule door and trap, a diagonally split trap having its parts hinged together to fold upwardly and permanently hinged to the end car wall and a hinge having a plate secured to the door and a leaf projecting therefrom and having spring-held members cooperating with members forming a part of the trap structure.

4. In a vestibule door and trap, a diagonally split trap having its parts hinged together to fold upwardly and permanently hinged to the end car wall, and a hinge having a plate secured to the door and a leaf pivotally secured to said plate and containing a spring latch mechanisms and releasing members and cooperating with catches countersunk in the trap.

5. In a vestibule door and trap, a diagonally split trap having its parts hinged together, to fold upwardly and permanently hinged to the end car wall, a hinge securing the trap to the door, and a ring countersunk in the trap adjacent to the split at the far corner from the door and adapted to lock and release the trap and open the door.

6. In a vestibule door and trap, a diagonally split trap having its parts hinged together to fold upwardly and permanently hinged to the end car wall, a hinge securing the trap to the door, and a latch bolt spring-held and slidably arranged on the underside of the trap, and bridging the diagonal split of the corner and locking on the underside and having an attached ring ordinarily countersunk in the trap and adapted to draw the locking bolt and lift the trap and open the vestibule door.

Signed at Montreal, Canada, this 8th day of January, 1925.

RALPH NORMAN PATTERSON.
ALFRED GRAVE FELL.